(12) United States Patent
Johannisson et al.

(10) Patent No.: US 7,069,053 B2
(45) Date of Patent: Jun. 27, 2006

(54) ANTENNA ARRANGEMENT AND METHOD RELATING THERETO

(75) Inventors: Björn Johannisson, Kungsbacka (SE); Anders Derneryd, Gothenburg (SE); Lars Josefsson, Askim (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 546 days.

(21) Appl. No.: 10/328,180

(22) Filed: Dec. 26, 2002

(65) Prior Publication Data

US 2003/0139198 A1    Jul. 24, 2003

Related U.S. Application Data

(63) Continuation of application No. PCT/SE01/01266, filed on Jun. 7, 2001.

(30) Foreign Application Priority Data

Jun. 26, 2000 (SE) .................................. 0002371

(51) Int. Cl.
*H04Q 7/20* (2006.01)
*H04B 7/00* (2006.01)

(52) U.S. Cl. ............... 455/562.1; 455/272; 455/277.1; 455/25; 342/386; 342/373

(58) Field of Classification Search ............ 455/562.1, 455/13.3, 25, 269, 272, 277.1, 277.2, 279.2, 455/525; 342/386, 373, 367, 368, 374; 370/334
See application file for complete search history.

(56) References Cited

U.S. PATENT DOCUMENTS 4,424,500 A * 1/1984 Viola et al. ................. 333/128
4,638,317 A * 1/1987 Evans ......................... 342/373
5,812,088 A * 9/1998 Pi et al. ....................... 342/373
6,081,233 A    6/2000 Johannisson (Continued)

FOREIGN PATENT DOCUMENTS

EP    0 755 093 A1    1/1997

OTHER PUBLICATIONS

International Search Report mailed Sep. 28, 2001 in corresponding PCT application No. PCT/SE01/01266.

(Continued)

*Primary Examiner*—Edan Orgad
(74) *Attorney, Agent, or Firm*—Nixon & Vanderhye, P.C.

(57) ABSTRACT

The present invention relates to an omnidirectional base station antenna arrangement with a number of antenna elements and a number of transceiver means for transmitting and receiving signals to/from a number of user stations. A feeding network is provided which comprises a number of phase ports, a number of which form first phase ports connected to a number of transceiver means for downlink communication and a number of which form second phase ports connected to a number of transceiver means for uplink communication. The feeding network comprises a number of antenna ports connected to antenna elements and the feeding network generates substantially independent, orthogonal signals to provide for phase diversity and the antenna elements are arranged to form at least one cylindrical array antenna. The invention also relates to a method of providing communication between an omnidirectional base station antenna arrangement with a number of antenna elements and a number of transceiver means and a number of user stations as well as to a method of providing for at least phase diversity transmission at an omnidirectional base station antenna arrangement.

32 Claims, 8 Drawing Sheets

U.S. PATENT DOCUMENTS 6,785,559 B1 * 8/2004 Goldberg et al. ........ 455/562.1

OTHER PUBLICATIONS

Mahmoudi et al; "Adaptive Sector Size Control in a CDMA System Using Butler Matrix", Vehicular Technology Conference, 1999 IEEE 49th, vol. 2, May 16-20, 1999, pp. 1355-1359.

Patent Abstracts of Japan, Abstract of JP 8-111651 A (Miyoshi Denshi KK), Apr. 30, 1996.

De Lillo, "A High Performance 8-Input, 8-Ooutput Butler Matrix Beamforming Network for Ultra-Broadband Applications", Antennas an Propagation Society International Symposium, 1993, AP-S Digest, vol. 1, pp. 474-477.

Patent Abstracts of Japan, Abstract of JP 2000-022439 (Nippon Telegr & Teleph Corp), Jan. 21, 2000.

* cited by examiner

ANTENNA ARRANGEMENT AND METHOD RELATING THERETO

This application is a continuation of international application PCT/SE01/01266 filed 7 Jun. 2001 which designates the U.S.

TECHNICAL FIELD

The present invention relates to a base station antenna arrangement with a number of antenna elements and a number of transceiver means for communication with user stations. The invention also relates to a method of providing communication between a base station antenna arrangement comprising a number of antenna elements and a number of transceiver means, and a number of user stations. Particularly the invention also relates to a method of providing at least phase diversity transmission at a base station antenna arrangement.

STATE OF THE ART

Cellular (mobile) telecommunication systems and other wireless (cellular or non-cellular; mobile or non-mobile) communication systems normally require a considerable number of base station antenna arrangements. They need to be provided all over the area that is to be covered by the cellular communication system. The way they are arranged is among other things governed by the quality requirements, the wanted geographical coverage, the distribution of mobile units or other factors and so on. Radio propagation is strongly affected by the terrain or the landscape, and irregularities therein, and in a city, the situation gets complicated due to buildings, constructions etc. and the base station antenna arrangements often have to be arranged quite close to each other. The installation of base station antenna arrangements also gets complicated due to a number of factors in addition to the pure technical factors in that there is a general requirement that the installations be more or less aesthetical in the cities as well as on the countryside. Also for Radio in the Local Loop installations; wireless LAN:s (Local Area Networks), i.e. both indoor and outdoor installations, there are complications. Therefore it is generally desirable to reduce the number of base station antenna installations as much as possible as well as it is desired to reduce their size as much as possible.

Typical cellular systems have allocated the up- and downlink in two different frequency bands with simultaneous transmission, Frequency Division Duplex (FDD). Base station antenna arrangements in such systems often use the same antenna for both transmission and reception. The reasons therefore are that they should be aesthetic, the costs for antennas, feeding networks and installation and maintenance should also be kept as low as possible.

Generally two different types of uplink diversity are used in systems of today. One type of uplink diversity is so called spatial or space diversity which can be implemented through separating antennas from each other. Another way of obtaining uplink diversity is to use polarization diversity. Polarization diversity makes use of the fact that fading is largely uncorrelated in orthogonal polarization directions. Polarization diversity is attractive in that only one antenna is needed and both polarizations are used on the uplink whereas a single polarization direction usually is selected for each carrier or transceiver on the downlink.

Figure 1:
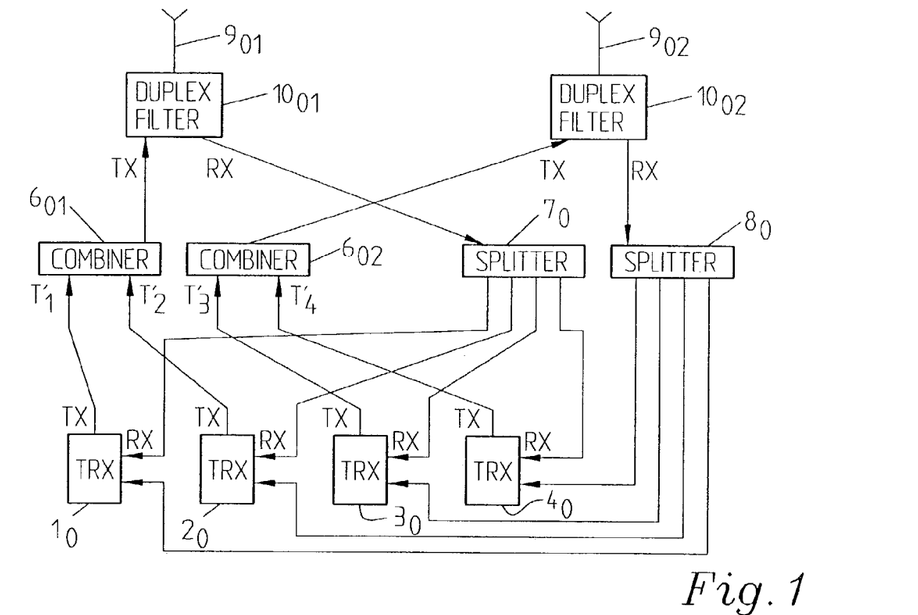
FIG. 1 for explanatory reasons shows a state of the art antenna arrangement.

FIG. 1 shows a state of the art omni-directional base station antenna arrangement. This known arrangement uses space diversity. The arrangement comprises four transceivers of which two are connected to one combiner whereas the other two are connected to another combiner for downlink communication. One of the combiners is connected to one duplex filter connected to one of the antennas and the other combiner is connected to another duplex filter in turn connected to the other antenna. Typically one duplex filter is connected to each antenna. For uplink communication each duplex filter is connected to a splitter, wherein each splitter communicates with each of the transceiving means.

It is a disadvantage of such systems that the duplex filters introduce excessive losses to the transmitted and received signals in the system. In order to be able to manage the losses, it is known to use large cavity filters. Such filters are both expensive and demand a lot of volume.

As an alternative, different antennas can be used on the uplink and on the downlink respectively. Such a solution will, however, result in additional costs for feeding networks and antenna hardware. Moreover the costs for installations will be higher. Still further it is often not possible to use separate antennas for the up- and the downlink respectively for aesthetic reasons.

Typically the downlink combiner introduces even higher losses than the duplex filter. Often standard hybrid power combiners are used which give at least 3 dB loss for every combining level and if a large number of transceivers is needed, the losses will indeed be severe on the downlink.

"Novel method of multiplexing radiocommunication antennas using circular-array configuration" by J. R. F. Guy et al. in IEE Proceedings, Vol. 130, No. 6, 1983, p. 410–414, discloses an antenna which is fed from a multiple-port feeding network giving a number of electrically independent patterns having an omni-directional coverage. Particularly a Butler matrix is used as a feeding network. However, it is not described how this is implemented in a base station where diversity performance and filter configurations are essential. Only a repeater application is presented.

Still further, WO 98/28861 discloses an antenna arrangement and a method of providing diversity. The document discloses an arrangement providing phase diversity but it is not disclosed how such diversity actually is provided for and such an arrangement would still require large filters on the downlink.

Thus, none of the known arrangements discloses a solution which provides for diversity in a satisfactory manner, i.e. a low cost, aesthetic solution with low losses.

BRIEF SUMMARY

What is needed is therefore an antenna arrangement which provides for diversity and in which the losses for transmitted and/or received signals are low. Particularly an antenna arrangement is needed which does not require bulky and expensive filters. Still further an antenna arrangement is needed through which the losses produced through downlink combiners can be reduced as compared to hitherto known arrangements. Particularly an antenna arrangement is needed which allows a large number of transceivers without this leading to too serious losses on the downlink. Particularly an antenna arrangement is needed through which it is possible to control the performance on the uplink in relation to the performance on the downlink. Further yet an antenna arrangement is needed through which it is possible to get omnidirectional beams on both uplink and downlink. An antenna arrangement using directional antennas fulfilling one or more of the above mentioned objects is also needed.

A method for providing communication between a base station antenna arrangement and user stations fulfilling one or more of the above mentioned objects is also needed. Moreover a method of providing at least phase diversity transmission at a base station antenna arrangement meeting one or more of aforesaid objects is needed.

Therefore a base station antenna arrangement is provided which comprises a number of antenna elements and a number of transceiver means for transmitting and receiving signals to/from user stations. The antenna arrangement comprises a feeding network with a number phase ports of which phase ports some form first phase ports connected to a number of transceiver means for downlink communication and of which some form second phase ports connected to a number of receiver means for uplink communication. The feeding network further comprises a number of antenna ports connected to antenna elements. The feeding network generates substantially independent, orthogonal signals to provide for phase diversity and the antenna elements are arranged so as to form at least one cylindrical array antenna. Antenna element is in this application taken to mean a separate antenna element or a subarray of antenna elements.

In particular the performance on the uplink and on the downlink respectively can be controlled through arranging appropriate numbers of phase ports to form first and second phase ports respectively.

In a particularly advantageous implementation each first phase port, i.e. a phase port intended for downlink communication, is connected to one transceiver means, or each transceiver means is connected to a separate first phase port for downlink communication. In that manner there will be no need for any combiners on the downlink which is extremely advantageous since combiners produce considerable losses as discussed earlier in the application.

In other implementations a limited number of transceiver means are connected to one and the same first phase port, for example two, three or four transceiver means (but also more). However, in that case there will be some need for combiners even if the need for combiners will be reduced as compared to in hitherto known systems but the gain will be lower in this case as compared to the case when each transceiver means is connected to a separate first phase port.

In one implementation a transceiver means may be connected to more than one phase port. This accounts for one transceiver means or for more transceiver means, or even all.

In an advantageous implementation a number of signal splitting means are provided for splitting signals output from the second phase ports and each second phase port is connected to one splitting means for uplink communication. Even more particularly at least two second phase ports, which thus are used for uplink communication, are provided each of which phase ports is directly connected to a separate splitting means enabling phase diversity reception. In one implementation each splitter means is connected to each transceiver means. Alternatively each splitter means is connected to a number of transceivers and this number may be different for different splitter means.

The number of phase ports generating orthogonal signals is lower than or equal to the number of antenna elements. In one particular implementation a common cylindrical antenna array is used for uplink and downlink communication. In another implementation separate cylindrical antenna arrays are used for up- and downlink communication respectively. Then advantageously at least two cylindrical antenna arrays may be provided and the feeding network particularly comprises two feeding network means (each actually constituting a feeding network) such that each cylindrical antenna array is connected to a separate feeding network means. One of the feeding network means handles downlink communication such that every phase port of such feeding network is used as first phase port and the other handles uplink communication and each of a number of phase ports communicates with a number of transceiver means via separate splitter mean.

In still another implementation a number of phase ports are used both as first and second phase ports for both uplink and downlink communication. Then these phase ports have to be connected to duplex filters. Thus, in this case duplex filters are actually needed, however to a lesser extent than in known arrangements.

According to different implementations it can also be provided for polarisation diversity. According to one embodiment polarisation diversity is provided on the uplink. Then two cylindrical antenna arrays with orthogonally polarized elements are used for the uplink whereas only one is used for the downlink. According to another embodiment polarisation diversity is provided for uplink as well as for downlink communication. Then two cylindrical antenna arrays are used for the downlink and two cylindrical antenna arrays are used for the uplink. When two separated antenna arrays are used on uplink and/or downlink, also space diversity can be introduced.

In still another embodiment polarisation diversity is provided for uplink as well as for downlink communication by the use of dual polarized antenna elements. Then only one antenna array is needed for uplink communication and only one for downlink communication.

According to preferred embodiments the feeding network comprises a Butler matrix. In the embodiments when there are more than one feeding network, or feeding network means, each such feeding network means comprises a separate Butler matrix. The antenna arrangement or each antenna means in ease there are more than one antenna arrangement as discussed above, comprises a cylindrical array antenna with a number of antenna elements arranged in N columns or subarrays which are fed through the (respective) Butler matrix to provide N orthogonal phase ports. Advantageously the spacing between the columns is approximately $\lambda/2$, wherein $\lambda$ is the signal wavelength.

The invention is however not limited to the use of a Butler matrix although this constitutes an advantageous embodiment, but the feeding network in more general terms can be characterized as a unitary orthogonal scattering matrix.

A method for providing communication between a base station antenna arrangement, which comprises a number of antenna elements and a number of transceiver means, and user stations is also provided. The method includes the steps of; connecting the transceiver means to a number of phase ports of a feeding network such that only a limited number of transceiver means are connected to each phase port; transforming signals from the transceiver means in the feeding network into signals which are substantially independent and orthogonal; putting out the orthogonal signals having different phase but similar amplitude on antenna ports to a number of antenna elements which are arranged in the form of one or more cylindrical array antennas. Particularly the method includes the step of; connecting each transceiver means to a separate phase port of the feeding network for downlink communication.

Alternatively more than one, but only a limited number, of transceiver means are connected to one and the same phase port. Still more particularly the method includes the steps of; feeding the cylindrical antenna array(s) comprising antenna elements arranged in N columns (subarrays)

through a feeding network which comprises a Butler matrix wherein the column spacing is between $\lambda/4-2\lambda$ such that an omnidirectional phase pattern is obtained which contains N cycles ($2\pi$) of phase variation. Even more particularly the method may include step of connecting at least two phase ports of the feeding network to uplink splitting means, connecting the uplink splitting means to at least a number of transceiver means such that, in addition to phase diversity transmission, also phase diversity reception is enabled.

In an advantageous implementation the method includes the steps of; controlling the relationship between the uplink and downlink performance through controlling the number of phase ports used for uplink and downlink communication respectively.

In an alternative implementation the method moreover includes the steps of; providing another cylindrical antenna array; connecting said other antenna array to a second feeding network (similar to the first feeding network referred to above); connecting at least some phase ports of the second feeding network to signal splitting means; connecting each of said splitting means to at least some of the transceiver means respectively such that phase diversity reception is enabled. In this manner separate cylindrical antenna arrays and separate feeding networks or feeding network means are used for uplink and downlink communication respectively.

In still another implementation the method may include the steps of; connecting some of the phase ports to signal splitting means for uplink communication, (for this purpose duplex filters have to be introduced); connecting each of the splitting means to a number of the transceiver means respectively such that also phase diversity reception is allowed. This thus constitutes still a further embodiment wherein some of the phase ports are used for both downlink and uplink communication.

Still further additional antenna arrays and feeding networks or feeding network means may be provided to enable for polarization diversity in addition to phase diversity. Alternatively or additionally space diversity may be provided (in addition to phase diversity).

The method may also include the step of connecting at least some transceivers to two phase ports (or more) of one and the same, or of different, feeding networks.

A method of providing at least phase diversity transmission at an omnidirectional base station antenna arrangement which comprises a number of antenna elements and a number of transceiver means is also disclosed. The method includes the steps of; providing signals from the transceiver means to a number of phase ports of a feeding network such that only a limited number of transceiver means are connected to each phase port; transforming signals from the transceiver means in the feeding network into signals which are substantially independent and orthogonal; outputting the substantially independent and orthogonal signals having different phase but similar amplitude on antenna ports to a number of antenna elements arranged to form a cylindrical array antenna. Advantageous implementations of the method are similar to those discussed above for example relating to merely connecting a transceiver means or each transceiver means to a separate phase port, using separate cylindrical antenna arrays for up- and downlink communication respectively or using one and the same cylindrical array antenna for both downlink and uplink communication or in addition to providing phase diversity transmission also providing for phase diversity reception or even more particularly to provide for polarization and/or space diversity as well, as discussed above.

BRIEF DESCRIPTION OF THE DRAWINGS

The invention will in the following be more thoroughly described in a non-limiting manner and with reference to the accompanying drawings in which.

DETAILED DESCRIPTION

In the block diagram of FIG. 1 a conventional, omnidirectional base station antenna arrangement with four transceivers TRX $1_0$, $2_0$, $3_0$, $4_0$ is disclosed. The illustrated device employs space diversity. A duplex filter $10_{01}$, $10_{02}$ is connected to each antenna $9_{01}$, $9_{02}$. For downlink communication, the signals from TRX $1_0$, $2_0$ are combined in combining means $6_{01}$ whereas the signals $T_3'$, $T_4'$ from TRXs $3_0$, $4_0$ are combined in combining means $6_{02}$. The combined signals $T_1'$, $T_2'$ are provided to duplex filter $10_{01}$ and then output to antenna means $9_{01}$. In a similar manner signals $T_3'$, $T_4'$ are combined in combining means $6_{02}$, output to duplex filter $10_{02}$ and provided to antenna means $9_{02}$. As referred to earlier in the application, the downlink combining means $6_{01}$, $6_{02}$ introduce very high losses and for an arrangement containing more transceivers, the losses on the downlink will indeed be severe.

For uplink communication, signals received in the antenna means $9_{01}$, $9_{02}$ are input to the respective duplex filters $10_{01}$, $10_{02}$ from where the signals are provided to each a splitting means $7_0$, $8_0$, which split up the respective signals and provide them to each TRX $1_0$, $2_0$, $3_0$, $4_0$. The duplex filters introduce losses both to transmitted and received signals and in order to be able to manage the losses, often large cavity filters are used which, as referred to earlier, however are expensive and take up much space.

Figure 2A:
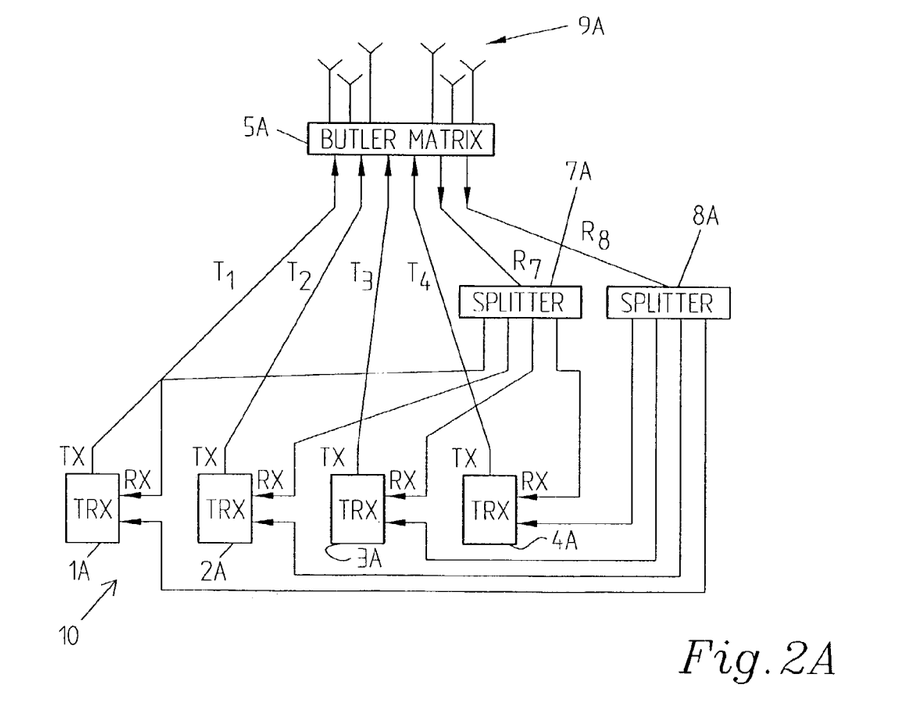
FIG. 2A shows an exemplary block diagram of one embodiment of an antenna arrangement.

In FIG. 2A a first embodiment of an arrangement 10 is illustrated. The antenna arrangement according to FIG. 2A includes four transceiver means TRX 1A, 2A, 3A, 4A. A substantially cylindrical antenna array 9A, here comprising six antenna elements (i.e. simple antenna elements or subarrays of antenna elements), is connected to a feeding network 5A which advantageously comprises a Butler matrix. By substantially cylindrical is here meant a cylinder with a cross-section that is substantially circular, or in the form of a polygon. This is relevant to all embodiments described herein. Omni-directional beams with the same coverage on both up- and downlink are provided. The feeding network 5A comprises, in the particularly illustrated embodiment, six phase ports. At least two of the phase ports of the feeding network (which is a requirement), are connected directly to uplink splitting means 7A, 8A for phase diversity reception whereas the other four (here) phase ports are connected to the downlink transceiver ports, i.e. in this implementation each transceiver TRX 1A, 2A, 3A, 4A is provided with its own phase port in the feeding network to which transmit signals $T_1$, $T_2$, $T_3$, $T_4$ are input for downlink communication. Each splitting means 7A, 8A is connected to each of the TRXs 1A, 2A, 3A, 4A. In the illustrated implementation no filters are shown and might not even be needed. However, depending on isolation performance in the antenna arrangement, some amount of filters may still be needed, in any case it is indeed not required as many and as large filters as in traditional installations using duplex filters.

That a plurality of phase ports are provided for downlink communication, will have as a consequence that the number of combiners that are needed is considerably reduced as fewer transceivers are connected to each phase port. If each transceiver has its own phase port, as in the illustrated embodiment, no downlink combining at all is needed and therefore no combining losses are encountered, which is extremely advantageous.

It is possible to control the performance relation on the up- and the downlink respectively depending on how many phase ports are used for uplink communication and for downlink communication respectively, which also is very advantageous.

The orthogonal phase progression can be achieved wit a cylindrical antenna array which is properly fed using a feeding network such as a Butler matrix. Of course, it does not have to be a Butler matrix as any appropriate feeding network can be used. What is important is that substantially orthogonal and substantially independent signals are provided.

In general terms the feeding network provides substantially orthogonal signals and is described by a scattering matrix. The scattering matrix, here denoted S, of the feeding network is unitary which means that $S^H S = U$, wherein U denotes the unit matrix an the superscript H denotes a Hermitian conjugation that is both a transpose of the scattering matrix and a complex conjugate of the respective matrix element. Such a network is ideally loss-less and all columns of the scattering matrix are mutually orthogonal.

Thus a cylindrical antenna array with N columns fed through, for example, a Butler matrix will give N orthogonal phase ports. Cf. also "Novel Method of multiplexing radio-communication antennas using circular-array configuration", IEE Proc. Vol. 130, Pt, H, pp. 410–414, Oct. 1983 by J. R. F. Guy and D. E. N. Davies which herewith is incorporated herein by reference thereto.

The N-th order phase port generates an antenna excitation that is constant in amplitude but which has a phase variation around the cylindrical array containing N complete ($2\pi$) cycles of phase change. Provided that the column spacing is of the order half a wavelength or less, the far-field radiation pattern will be substantially constant in amplitude, i.e. it is omnidirectional and contains N cycles of phase variation.

The number of antenna ports is in FIG. 2A illustrated to be six, but there may also be more, however, there may not be more orthogonal phase ports than antenna elements but there may well be more antenna elements than orthogonal phase ports in use.

Figure 2B:
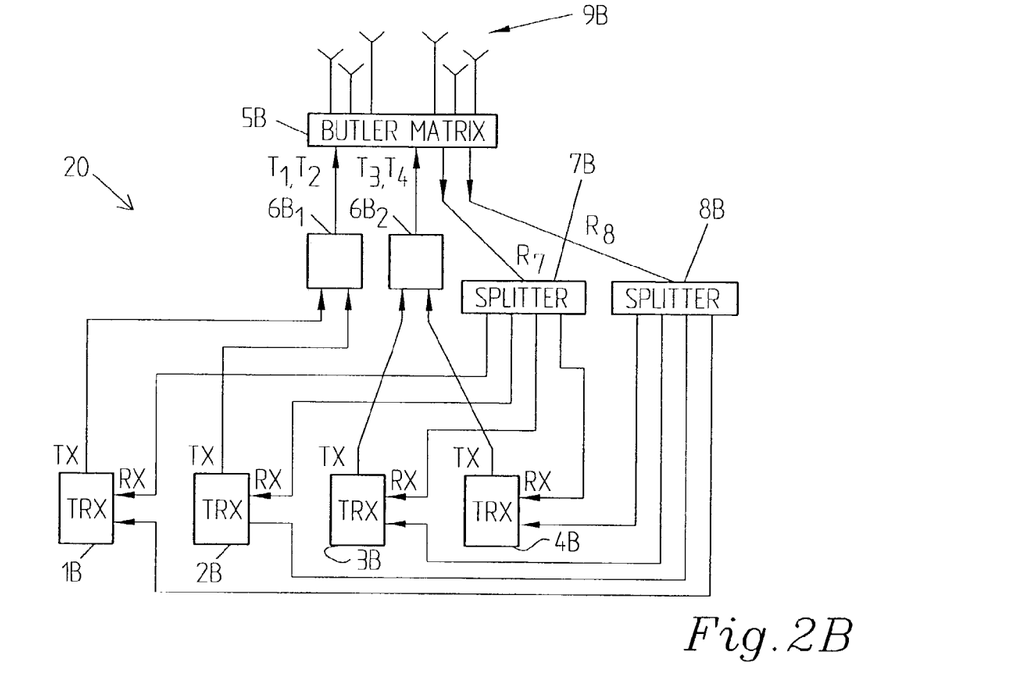
FIG. 2B shows an alternative implementation in which two transceiver means are connected to one phase port.

In FIG. 2B an alternative implementation is illustrated. The antenna arrangement 20 is similar to that of FIG. 2A in that it contains four transceiver means, TRXs 1B, 2B, 3B, 4B and a feeding network in the form of e.g. a Butler matrix 5B. It also comprises a cylindrical array antenna 9B with six antenna elements. However, in this case two transceiver means TRX 1B, 2B are connected to one and the same phase port of the Butler matrix 5B whereas TRXs 3B,4B are connected to another phase port of the Butler matrix 5B. This means that some combining means have to be provided and the signals from TRX 1B, 2B are combined in combining means $6B_1$ whereas the signals from TRXs 3B, 4B are combined in combining means $6B_2$.

The combining means $6B_1$, $6B_2$ input combined transmit signals $T_1$, $T_2$ and $T_3$, $T_4$ respectively to the respective phase ports. Similar to FIG. 2A splitting means 7B, 8B are provided receiving signals $R_7$, $R_8$ over the two orthogonal phase ports used for uplink communication. The splitting means 7B, 8B provide signals to each of the TRXs respectively. Thus, in this case there are still required some combining means, however, the losses are considerably lower than in known arrangements since there are only two signals provided to each combining means.

In still other embodiments there may also be three or four transmit signals input to one and the same combining means. The main point is that there are more phase ports than in known arrangement and needed combiners can be made smaller and simpler than in hitherto known arrangements. If a large number of transceiver means are used, such embodiments still are very advantageous. Moreover, the need for filters is considerably reduced.

Figure 2C:
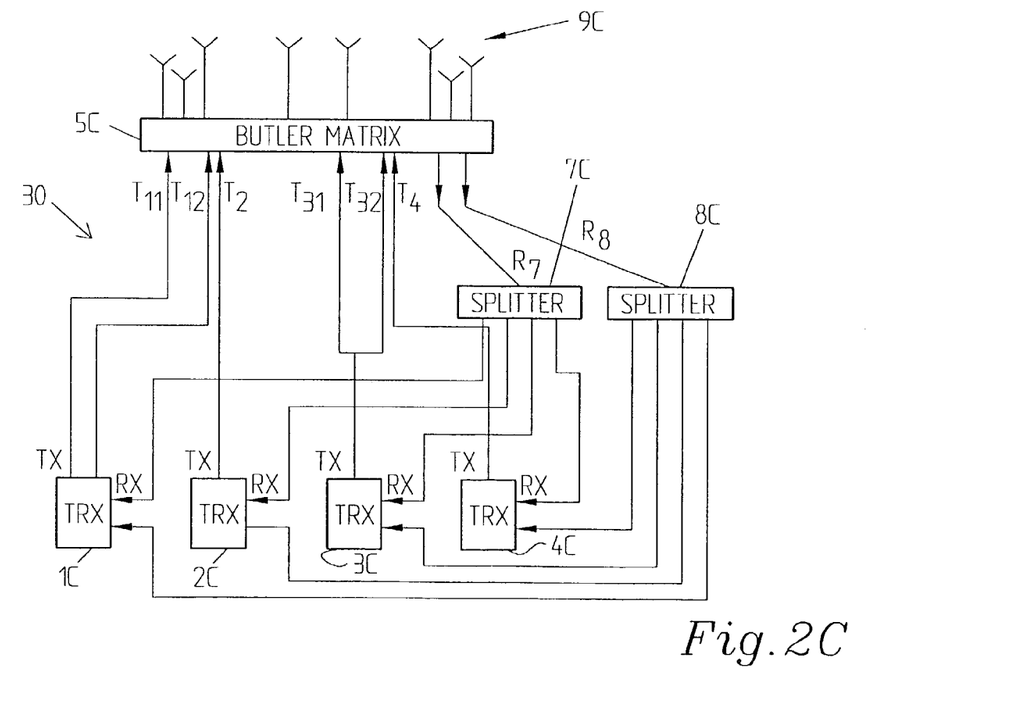
FIG. 2C shows still another implementation in which two transceiver means are connected to two phase ports.

In FIG. 2C still another implementation is illustrated. Also here the antenna arrangement 30 comprises four transceiver means TRX 1C, 2C, 3C, 4C, a feeding network 5C, e.g. in the form of a Butler matrix, and a cylindrical antenna array 9C here comprising for example eight antenna elements. For uplink communication two splitting means 7C, SC receiving signals $R_7$, $R_8$ over two phase ports intended for uplink communication are provided as in the preceding embodiments. However, for downlink communication, TRX 1C is connected to two phase ports inputting signals $T_{11}$, $T_{12}$ to each one of the phase ports and in a similar manner TRX 3C is connected to e.g. two other phase ports for providing signals $T_{31}$, $T_{32}$ over said phase ports to the feeding network 5C. In this embodiment it is supposed that TRXs 2C, 4C each only is connected to one phase port. However, also these TRXs could of course have been connected to two phase ports each. It is also possible to connect each transceiver means to for example three phase ports etc. In this manner beamforming is enabled.

A signal from a TRX connected to multiple phase ports can e.g. be splitted to the different ports, switched between the different ports, different time delays can be introduced (if e.g. one of the signals is delayed). In general terms downlink performance can be enhanced in that the respective signals can be modulated differently by time delay, switching and other kinds of modulation. Then delay elements, switches etc. may be needed. They are not shown since the functioning should be obvious to the one skilled in the art. Information can e.g. be divided such that a part of the information in a message is provided to the first phase port or feeding network whereas another part of the information is provided to the other phase port or feeding network, code diversity (for e.g. CDMA, Code Division Multiple Access, -systems) may also be implemented.

According to still another implementation separate antenna arrays can be used for uplink and downlink communication respectively. Such an antenna arrangement 40 is schematically illustrated in the block diagram of FIG. 3. Through using separate antennas for the uplink and the downlink respectively, a very high isolation will be provided between up- and downlink which even more reduces the need for filters, which is extremely advantageous.

Figure 3:
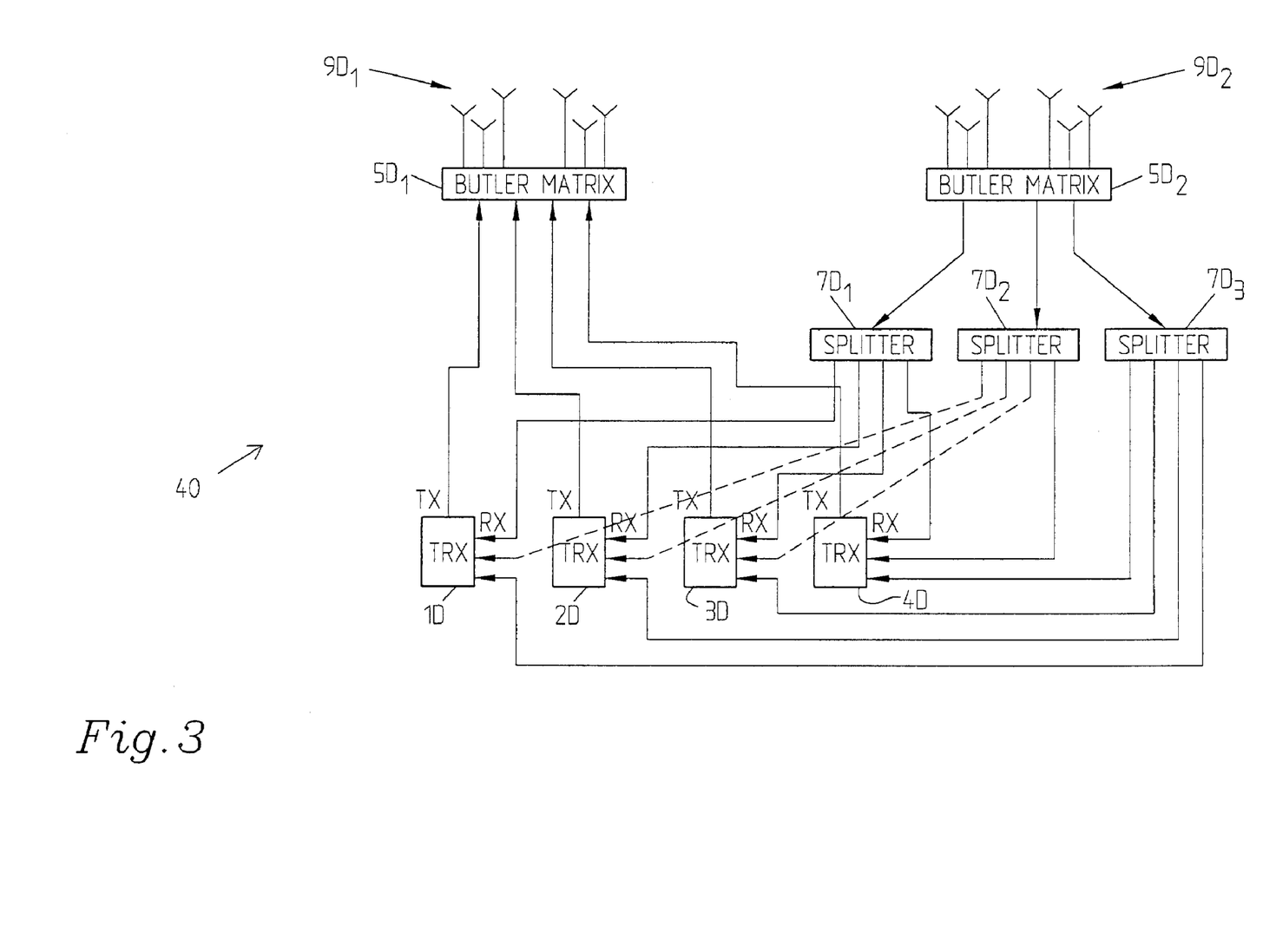
FIG. 3 shows an alternative antenna arrangement according to another embodiment when separate antenna arrays are used for uplink and downlink communication respectively, FIG. 4 schematically illustrates, in the form of a block diagram, still another implementation according to which some of the phase ports are used for both uplink and downlink communication.

In the illustrated embodiment there are four TRXs, 1D, 2D, 3D, 4D each using a separate phase port of the feeding network $5D_1$, e.g. a Butler matrix, connected to a cylindrical antenna array $9D_1$ with, here, six antenna elements.

For uplink communication another feeding network $5D_2$ is provided to which a second cylindrical antenna array $9D_2$ comprising six antenna elements is connected. Three of the phase ports (here) of the second feeding network $5D_2$ are connected to each a splitting means $7D_1$, $7D_2$, $7D_3$ wherein splitting means $7D_1$ splits a signal input via one of the phase ports and provides it to each of the transceiver means 1D, 2D, 3D, 4D whereas the second splitting means $7D_2$ provides signals to transceiver means 1D, 2D, 3D, 4D and finally the third splitting means $7D_3$ receives signals over another phase port and provides signals to TRXs 1D, 2D, 3D, 4D. It should however be clear that this merely relates to a particular implementation. The cylindrical antenna arrays $9D_1$, $9D_2$ do thus not have to be similar but they can be optimized independently of one another as well as the feeding networks $5D_1$ and $5D_2$ can be. The cylindrical antenna arrays may for example be arranged on different heights but also in other aspects there may be provided for different variations.

Figure 4:
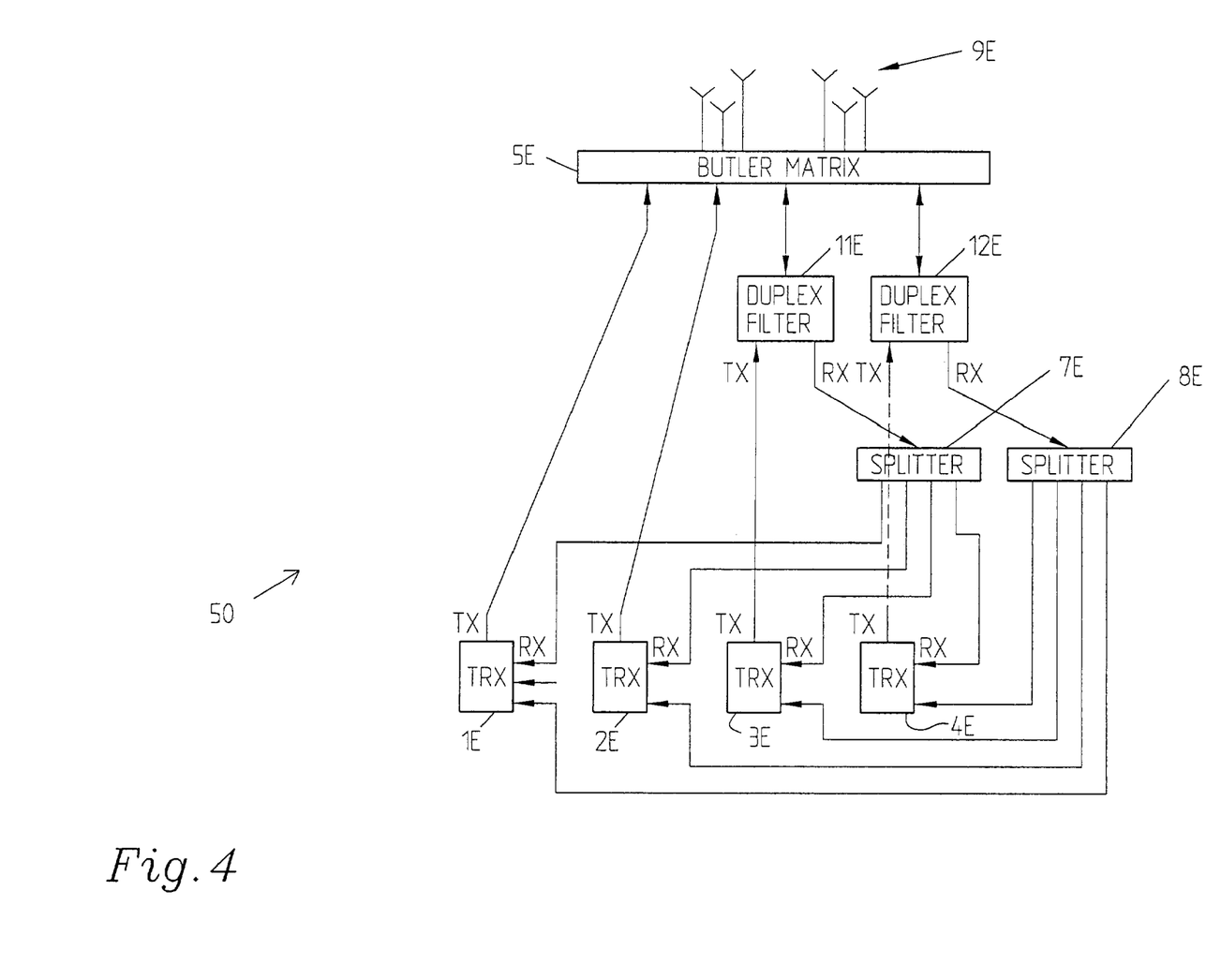

Yet another antenna arrangement 50 is illustrated in FIG. 4. According to this embodiment some phase ports are used both for downlink communication and uplink communication. In that manner a particularly efficient usage of phase ports is achieved. Then, however duplex filters have to be used, but the advantage of reduced combining losses on the downlink is still achieved. Particularly the feeding network need not have so many phase ports. Four transceiver means 1E, 2E, 33,43 are illustrated also in this case. It should however be clear, that even if in all the illustrated embodiments four transceiver means are illustrated, the invention is of course not limited thereto but there may be any number of transceiver means and the number of four is selected just for reasons of clarity as far as the drawings are concerned. The same accounts for the number of antenna elements in an array.

TRXs 1E, 2E are each connected to a separate phase port of the feeding network 5E, e.g. a Butler matrix, which feeds a cylindrical antenna array 9E, here with six antenna elements. However, the two remaining phase ports on the Butler matrix 5E are connected to duplex filters 11E, 12E which for uplink communication are connected to splitting means 7E, 8E and wherein the first duplex filter 11E is connected to TRX 3E for downlink communication and for uplink communication it is connected to splitting means 7E whereas the second duplex filter 12E is connected to TRX 4E for downlink communication and for uplink communication to splitting means 8E which splits an incoming signal and provides it to TRXs 1E, 2E, 3E, 4E.

Often high pass filters and low pass filter are also needed but they are generally implemented in the transceiving means and they are not illustrated.

Thus, it is possible to reduce do ink losses produced by filters and combiners when transmitting signals from an omnidirectional base station antenna arrangement. Receive diversity is also obtained through the use of two or more orthogonal phase progression channels on the uplink.

Figure 5:
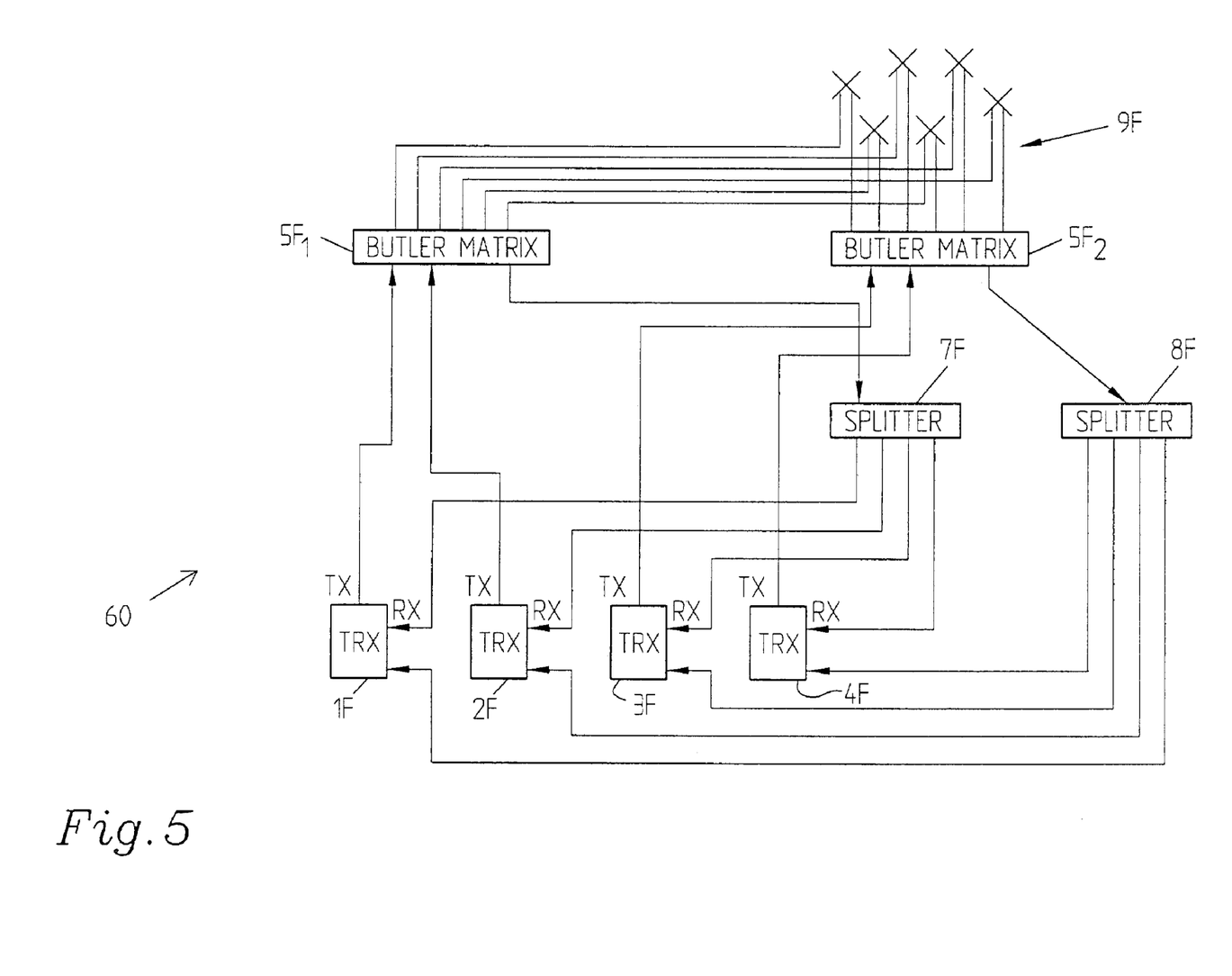
FIG. 5 shows still another implementation in which also is provided for polarization diversity.

FIG. 5 shows a dual polarized omnidirectional antenna arrangement 60 giving phase diversity and polarisation diversity. TRXs 1F, 2F are over two phase ports connected to a first feeding network means, e.g. a Butler matrix $5F_1$ for one polarisation whereas a third phase port of feeding network $5F_1$ is connected to a splitting means 7F, splitting a received signal and providing it to TRXs 1F–4F. TRXs 3F, 4F are connected to a second feeding network means $5F_2$, also e.g. a Butler matrix, for another polarisation. A third phase port is for uplink communication connected to a second splitting means 8F communicating with TRXs 1F–4F. One dual polarized cylindrical antenna array 9F is used. Common or interleaved antenna elements are used for both polarisations.

Figure 6:
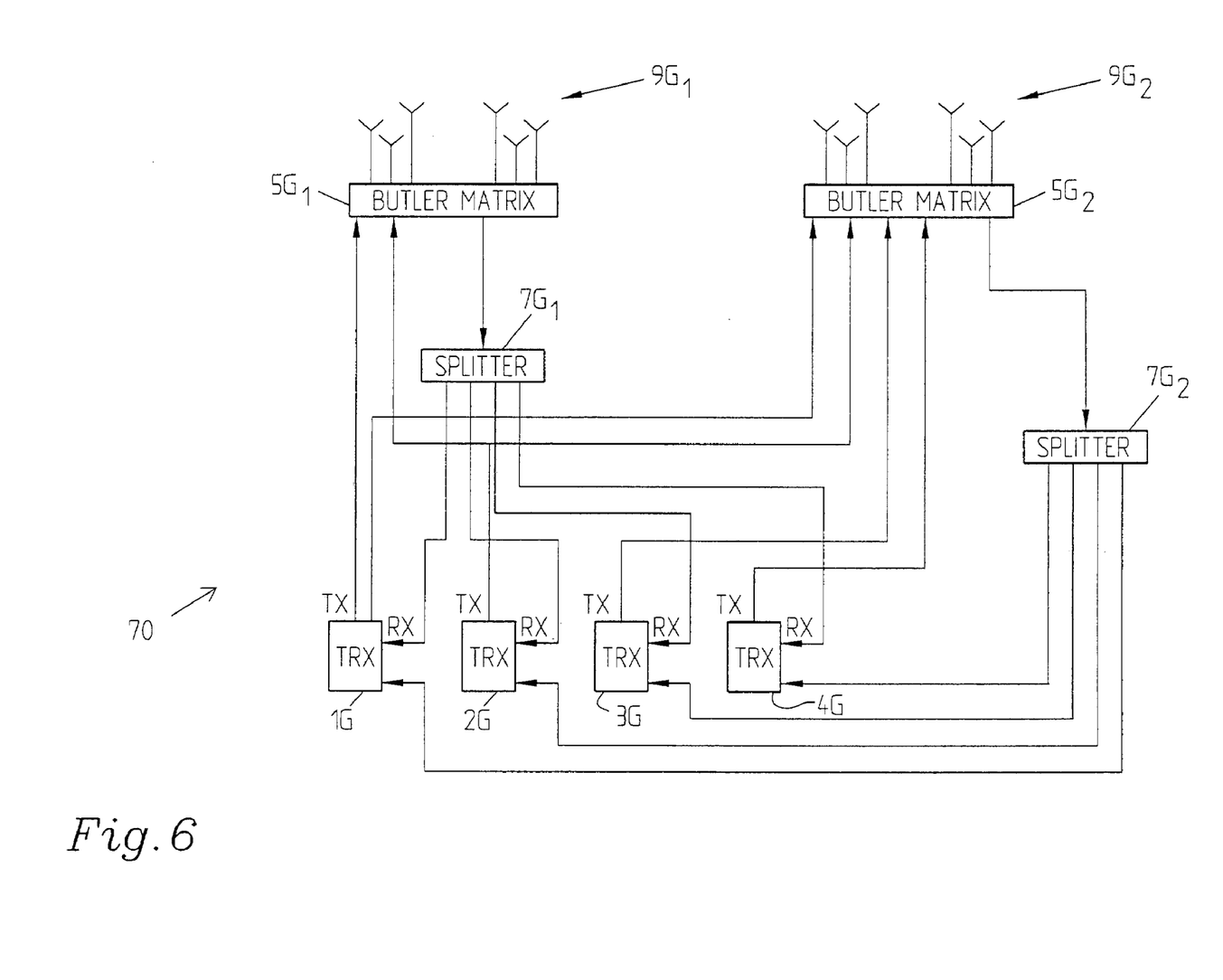
FIG. 6 shows one embodiment in which receive and transmit, phase and space diversity is provided using two antenna arrays.

FIG. 6 shows still another implementation of an arrangement 70 through which phase and space diversity can be provided. Also in this embodiment there are four transceivers TRX 1G, 2G, 3G, 4G. Two feeding networks (e.g. Butler matrixes) $5G_1$, $5G_2$ are each connected to a separate cylindrical array antenna $9G_1$, $9G_2$. TRX 1G is connected to the first feeding network $5G_1$ and the second feeding network $5G_2$. Thus substantially the same signal can be provided to each feeding network but it may e.g. be differently delayed, information can be divided such that a part of the information in a message is provided to the first feeding network whereas another part of the information is provided to the other feeding network, code diversity (for e.g. CDMA, Code Division Multiple Access, systems) may also be implemented. Then one of the signals is multiplied a first code whereas the other is multiplied wit a second code, etc.

TRX 2G is also connected to both the first and the second feeding networks $5G_1$, $5G_2$. A switch or a delay element may be provided to switch the signal between the two network or to delay it differently. Splitting means $7G_1$, $7G_2$ are provided similar to FIG. 5. On the uplink is provided for space diversity and on the downlink a signal can be split up on two (or in principle more) phase ports of different feeding networks connected to different antenna arrays $9G_1$, $9G_2$, thus avoiding combining losses. Hence, also on the downlink a diversity gain is provided for.

Through splitting up a signal as disclosed above beamforming is enabled in downlink.

Figure 7:
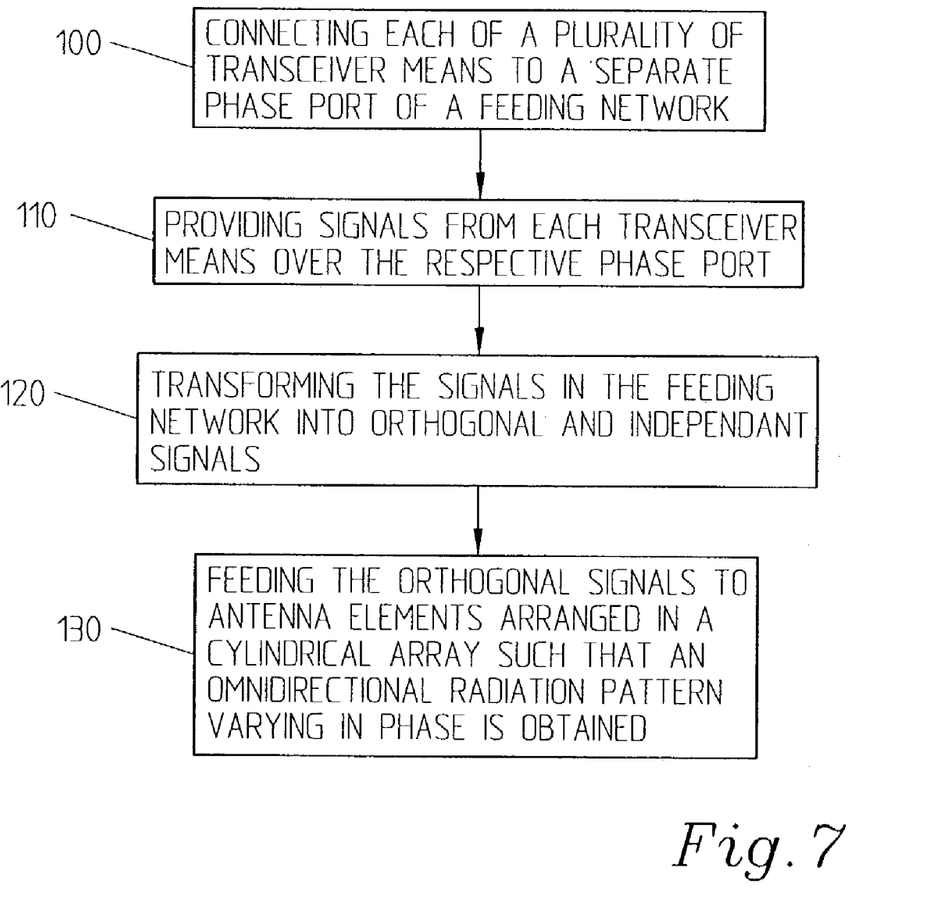
FIG. 7 is a flow diagram very schematically illustrating the method for providing phase diversity transmission, and, finally, FIG. 8 schematically illustrates a method of providing for phase diversity reception.

FIG. 7 is a flow diagram which very schematically illustrates the provision of transmit phase diversity and it discloses the steps of connecting each of a plurality of transceiver means to a separate phase port of a feeding network, 100. Signals from each transceiver means are provided over the respective phase ports, 110 and in the feeding network the signals are transformed into substantially orthogonal and substantially independent signals, 120. The orthogonal signals are fed to antenna elements arranged to form a cylindrical array such that an omnidirectional radiation pattern varying in phase is obtained, 130.

Figure 8:
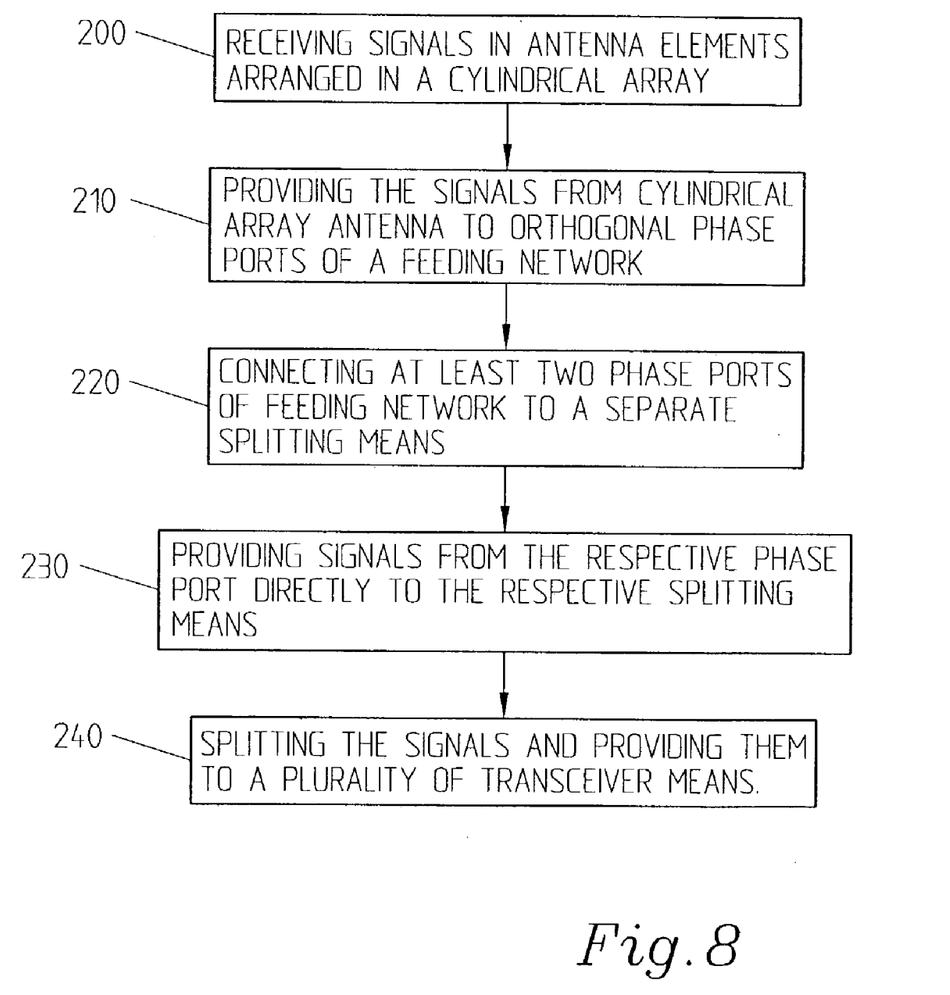

In a similar manner FIG. 8 is a flow diagram illustrating the provision of phase diversity reception on the uplink. First signals are received in antenna elements arranged in a cylindrical array, 200. The signals from the cylindrical array antenna are provided to orthogonal phase ports of a feeding network, 210. At least two of the phase ports of the feeding network are connected to a separate splitting means, 220, and the signals are provided from the respective phase port directly to the respective splitting means, 230. The signals are split in the splitting means and provided to each a number of transceiver means, 240.

It should be clear that the inventive concept is not limited to any particular access method. It is likewise applicable to TDMA (Time Division Multiple Access), FDMA (Frequency Division Multiple Access), CDMA (Code Division Multiple Access) and TDD (Time Division Duplex) as well as FDD (Frequency Division Duplex) may be implemented just as well as Space Time Coding or OFDM (Orthogonal Frequency Division Multiplex).

The inventive concept is also applicable to mobile (cellular or not cellular) communication systems, fixed communication systems using radio communication, e.g. Radio in the Local Loop, WLAN (Wireless LANs), antennas in broadband communication etc. Different kinds of diversity may also be provided for, such as phase diversity and one or both of space diversity and polarisation diversity.

It should be clear that also in other aspects the invention is not limited to the specifically illustrated embodiments but it can be varied in a number of ways without departing from the scope of the appended claims.

The invention claimed is:

1. An omnidirectional base station antenna arrangement comprising:
   a number of antenna elements forming a number of simultaneous omnidirectional radiation patterns;
   a number of transceivers for transmitting and receiving signals to/from a number of user stations; and,
   a feeding network comprising a phase port including first phase ports connected to a number of the transceivers for downlink communication and second phase ports connected to a number of the transceivers for uplink communication, said feeding network further comprising a number of antenna ports connected to antenna elements, which feeding network generates substantially independent, orthogonal signals to provide for phase diversity and in that the antenna elements are arranged to form at least one cylindrical array antenna.

2. An antenna arrangement according to claim 1, wherein performance on the uplink and on the downlink respectively is controllable through a number of phase ports that are arranged to form first and second phase ports respectively.

3. An antenna arrangement according to claim 1, wherein each first phase port is connected to one transceiver.

4. An antenna arrangement according to claim 3, wherein each transceiver is connected to a separate first phase port of the feeding network.

5. An antenna arrangement according to claim 1, wherein more than one transceiver is connected to one and the same first phase port for at least some of the phase ports.

6. An antenna arrangement according to claim 1, wherein a transceiver is connected to more than one phase port.

7. An antenna arrangement according to claim 1, wherein a number of signal splitters are provided for splitting signals output from the second phase ports on the uplink and wherein each second phase port in use is connected to one splitter.

8. An antenna arrangement according to claim 7, wherein at least two second phase ports for uplink communication are provided, each of said second phase port being directly connected to a separate signal splitter for enabling phase diversity reception.

9. An antenna arrangement according to claim 8, wherein each signal splitter is connected to each transceiver.

10. An antenna arrangement according to claim 8, wherein each splitter is connected to a number of transceivers which number may be different for a different splitter.

11. An antenna arrangement according to claim 1, wherein the number of phase ports in use generating orthogonal signals is lower than or equal to the number of antenna elements.

12. An antenna arrangement according to claim 1, wherein a common cylindrical antenna array is used for uplink and downlink communication.

13. An antenna arrangement according to claim 1, wherein separate cylindrical antenna arrays are used for uplink and downlink communication respectively.

14. An antenna arrangement according to claim 13, wherein at least two cylindrical antenna arrays are provided and wherein the feeding network comprises two feeding networks such that each cylindrical antenna array is connected to a separate feeding network, a first the separate feeding networks handling downlink communication whereby every phase port of the first feeding network is used as a first phase port, and a second of the separate feeding networks handling uplink communication, each of a number of phase ports communicating with a number of transceiver means via separate splitter.

15. An antenna arrangement according to claim 12, wherein at least one cylindrical antenna array is used for downlink communication and at least two cylindrical antenna arrays are used for uplink communication to provide for space diversity.

16. An antenna arrangement according to claim 12, wherein at least one dual polarized antenna array is used to provide for polarisation diversity.

17. An antenna arrangement according to claim 1, wherein a number of phase ports are used both as first and second phase ports for both uplink and downlink communication and in that said phase ports are connected to duplex filters.

18. An antenna arrangement according to claim 1, wherein the feeding network comprises a unitary orthogonal scattering matrix.

19. An antenna arrangement according to claim 18, wherein the feeding network comprises a Butler matrix.

20. An antenna arrangement according to claim 18, wherein the antenna arrangement comprises a cylindrical array antenna with antenna elements arranged in N columns or subarrays which are fed through the/a matrix to give maximum N orthogonal phase ports.

21. An antenna arrangement according to claim 20, wherein spacing between the columns is approximately $\lambda/4$–$2\lambda$, $\lambda$ being the signal wavelength.

22. A method of providing communication between an omnidirectional base station antenna arrangement, comprising a number of antenna elements, forming a number of simultaneous omnidirectional radiation patterns, and a number of transceivers, and a number of user stations,
   the method comprising the step of:
   connecting the transceivers to a number of phase ports of feeding network such that only a limited number of transceivers are connected to each phase port;
   transforming signals from the transceivers in the feeding network into signals which are substantially independent and orthogonal to provide for phase diversity,
   transforming signals from the transceivers in the feeding network into signals which are substantially independent and orthogonal to provide for phase diversity,
   putting out the orthogonal signals having different phase but similar amplitude on antenna ports to a number of antenna elements arranged to form at least one cylindrical array antenna.

23. The method of claim 22, further comprising:
   connecting each transceiver to a separate phase port of the feeding network for downlink communication.

24. The method of claim 22, further comprising:
feeding the cylindrical antenna array comprising antenna elements arranged in N columns through a feeding network comprising a Butler matrix wherein the column spacing is $\lambda/4$–$2\lambda$ such that an omnidirectional phase pattern is obtained containing N cycles of phase variation.

25. The method according to claim 22, further comprising:
connecting at least two phase ports of the feeding network to an uplink splitter,
connecting the uplink splitter to at least a number of the transceivers such that phase diversity reception is enabled.

26. The method according to claim 25, further comprising:
controlling a relationship between uplink and downlink performance through controlling the number of phase ports used for uplink and downlink communication respectively.

27. The method according to claim 22, further comprising:
providing another cylindrical antenna array,
connecting said other antenna array to a second feeding network,
connecting at least some phase ports of the second feeding network to signal splitters,
connecting each of said splitters to at least some of the transceivers respectively such that phase diversity reception is enabled.

28. The method according to claim 22, further comprising:
connecting some of the phase ports to signal splitters for uplink communication, (via duplex filters)
connecting each of said splitters to at least some of the transceivers respectively such that phase diversity reception is enabled.

29. The method according to claim 22, further comprising providing additional antenna arrays and feeding networks to enable polarisation diversity and/or space diversity.

30. The method of claim 22, further comprising connecting at least some transceivers to two or more phase ports to enable beamforming and different modulation of signals.

31. A method of providing at least phase diversity transmission at an omnidirectional base station antenna arrangement comprising a number of antenna elements, forming a number of simultaneous radiation patterns, and a number of transceivers, wherein the method comprises:
providing signals from the transceivers to a number of phase ports of a feeding network such that only a limited number of the transceivers are connected to each phase port;
transforming signals from the transceivers in the feeding network into signals which are substantially independent and orthogonal,
outputting the orthogonal signals having different phase(s) but similar amplitude(s) on output ports to a number of antenna elements arranged to form a cylindrical array antenna.

32. An antenna arrangement according to claim 1, wherein the antenna arrangement generates omni-directional beams.

* * * * *